(12) United States Patent
Kishimoto et al.

(10) Patent No.: US 8,085,631 B2
(45) Date of Patent: Dec. 27, 2011

(54) TRACKING CONTROL DEVICE, TRACKING CONTROL METHOD, AND OPTICAL DISC APPARATUS

(75) Inventors: Takashi Kishimoto, Nara (JP);
Takeharu Yamamoto, Osaka (JP);
Yoshirou Kashiwabara, Fukuoka (JP);
Akihiro Arai, Fukuoka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/793,038

(22) Filed: Jun. 3, 2010

(65) Prior Publication Data
US 2010/0309766 A1    Dec. 9, 2010

(30) Foreign Application Priority Data
Jun. 5, 2009   (JP) .................................. 2009-135850

(51) Int. Cl.
*G11B 7/00* (2006.01)
(52) U.S. Cl. ................ 369/44.35; 369/44.29; 369/44.41
(58) Field of Classification Search ................ 369/44.41, 369/44.37, 44.29, 44.35
See application file for complete search history.

(56) References Cited

U.S. PATENT DOCUMENTS
4,775,968 A    10/1988   Ohsato

| | | | |
|---|---|---|---|
| 7,272,084 B2 * | 9/2007 | Ishikawa | 369/44.29 |
| 2004/0213102 A1 * | 10/2004 | Yamada et al. | 369/44.37 |
| 2008/0101172 A1 * | 5/2008 | Kubota | 369/44.26 |

FOREIGN PATENT DOCUMENTS
| | | |
|---|---|---|
| JP | 61-94246 | 5/1986 |
| JP | 2005-310257 | 11/2005 |
| JP | 2009037714 A * | 2/2009 |

* cited by examiner

*Primary Examiner* — Latanya Bibbins
(74) *Attorney, Agent, or Firm* — Wenderoth, Lind & Ponack, L.L.P.

(57) ABSTRACT

The invention provides a tracking control device, a tracking control method, and an optical disc apparatus that enable to stably perform the tracking control, and reduce an influence of stray light from the other layer on the tracking control. A sub push-pull signal correcting section corrects a sub push-pull signal to be generated from returning light of a sub beam in such a manner that a track crossing component of a main push-pull signal to be generated from returning light of a main beam, and a track crossing component of the sub push-pull signal to be generated from the returning light of the sub beam are canceled. A low pass filter reduces a high frequency component of the sub push-pull signal corrected by the sub push-pull signal correcting section. A subtractor subtracts a sub push-pull signal passing the low pass filter from the main push-pull signal to thereby generate a tracking error signal.

8 Claims, 4 Drawing Sheets

TRACKING CONTROL DEVICE, TRACKING CONTROL METHOD, AND OPTICAL DISC APPARATUS

BACKGROUND OF THE INVENTION

1. Field of the Invention

The invention relates to a tracking control device and a tracking control method for converging a main beam and a sub beam on an information recording medium having plural information layers, and controlling a convergence point of the main beam to scan a track on the information layer. The invention also relates to an optical disc apparatus for optically recording information on an information recording medium or optically reproducing information from an information recording medium.

2. Description of the Background Art

Conventionally, there have been proposed various methods for detecting a tracking error signal to be used in tracking control in an optical disc apparatus. An example of the methods for detecting a tracking error signal is a differential push-pull method (hereinafter, also called as a "DPP method").

As is already known, in the DPP method, a light beam to be irradiated onto an optical disc is divided into three beams constituted of one main beam and two sub beams, and a push-pull signal is detected with respect to each spots of the main beam and the sub beams. Then, a differential signal between the push-pull signal of the main beam, and the push-pull signal of the sub beam is detected as a tracking error signal. In the DPP method, an offset is generated in both of the push-pull signal (hereinafter, also called as an "MPP signal") of the main beam, and the push-pull signal (hereinafter, also called as an "SPP signal") of the sub beam by e.g. lens shift or lens tilt. The offset can be cancelled based on a differential signal by properly setting a ratio between the MPP signal and the SPP signal (see e.g. JP Sho 61-94246A and JP 2005-310257A).

In the conventional optical disc apparatus, however, it is generally often the case that the intensity ratio between the main beam and the sub beam is set to about 10:1. In the case where information is recorded or reproduced on or from an optical disc having plural information layers such as a two-layer disc by the optical disc apparatus having the above configuration, the following drawback may occur.

Specifically, in the case where a light beam is converged on one of the information layers in a two-layer disc, it is difficult to separate reflection light from the one information layer and reflection light (stray light from the other layer) from the other of the information layers. As a result, a stray light component of the main beam from the other layer may be detected by a sub detector for receiving a sub beam. In particular, in the case where information is recorded without high frequency superimposition, an SPP signal may be fluctuated by interference of stray light of the main beam from the other layer. As a result, tracking control may become unstable, and in a worst case, a light beam may be off the track at the time of recording.

SUMMARY OF THE INVENTION

In view of the above, an object of the invention is to provide a tracking control device, a tracking control method, and an optical disc apparatus that enable to stably perform the tracking control, and reduce an influence of stray light from a layer other than a targeted layer on the tracking control.

A tracking control device according to an aspect of the invention is a tracking control device for converging a main beam and a sub beam on an information recording medium having plural information layers, and controlling a convergence point of the main beam to scan a track on the information layer. The tracking control device includes a tracking error signal detecting section which detects a tracking error signal depending on a positional displacement between the convergence point of the main beam, and the track on the information layer; and a tracking control section which controls the convergence point of the main beam to scan the track, based on the tracking error signal detected by the tracking error signal detecting section, wherein the tracking error signal detecting section includes: a sub push-pull signal correcting section which corrects a sub push-pull signal to be generated from returning light of the sub beam in such a manner that a track crossing component of a main push-pull signal to be generated from returning light of the main beam, and a track crossing component of the sub push-pull signal to be generated from the returning light of the sub beam are cancelled; a low pass filter which reduces a high frequency component of the sub push-pull signal corrected by the sub push-pull signal correcting section; and a tracking error signal generating section which subtracts a sub push-pull signal passing the low pass filter from the main push-pull signal to thereby generate the tracking error signal.

In the above arrangement, the sub push-pull signal is corrected in such a manner that the track crossing component of the main push-pull signal to be generated from the returning light of the main beam, and the track crossing component of the sub push-pull signal to be generated from the returning light of the sub beam are cancelled. Then, the high frequency component of the corrected sub push-pull signal is reduced, and the sub push-pull signal whose high frequency component is reduced is subtracted from the main push-pull signal to thereby generate the tracking error signal.

According to the invention, since the sub push-pull signal is corrected in such a manner that the track crossing component of the main push-pull signal to be generated from the returning light of the main beam, and the track crossing component of the sub push-pull signal to be generated from the returning light of the sub beam are cancelled, it is possible to reduce an offset generated at the time of lens shift to thereby stably perform the tracking control. Further, since the high frequency component of the sub push-pull signal is reduced, it is possible to reduce an influence of stray light of the main beam from the other layer on the tracking control.

DETAILED DESCRIPTION OF THE PREFERRED EMBODIMENTS OF THE INVENTION

In the following, embodiments of the invention are described referring to the accompanying drawings. The following embodiments are merely some examples embodying the invention, and do not limit the technical scope of the invention.

First Embodiment

Figure 1:
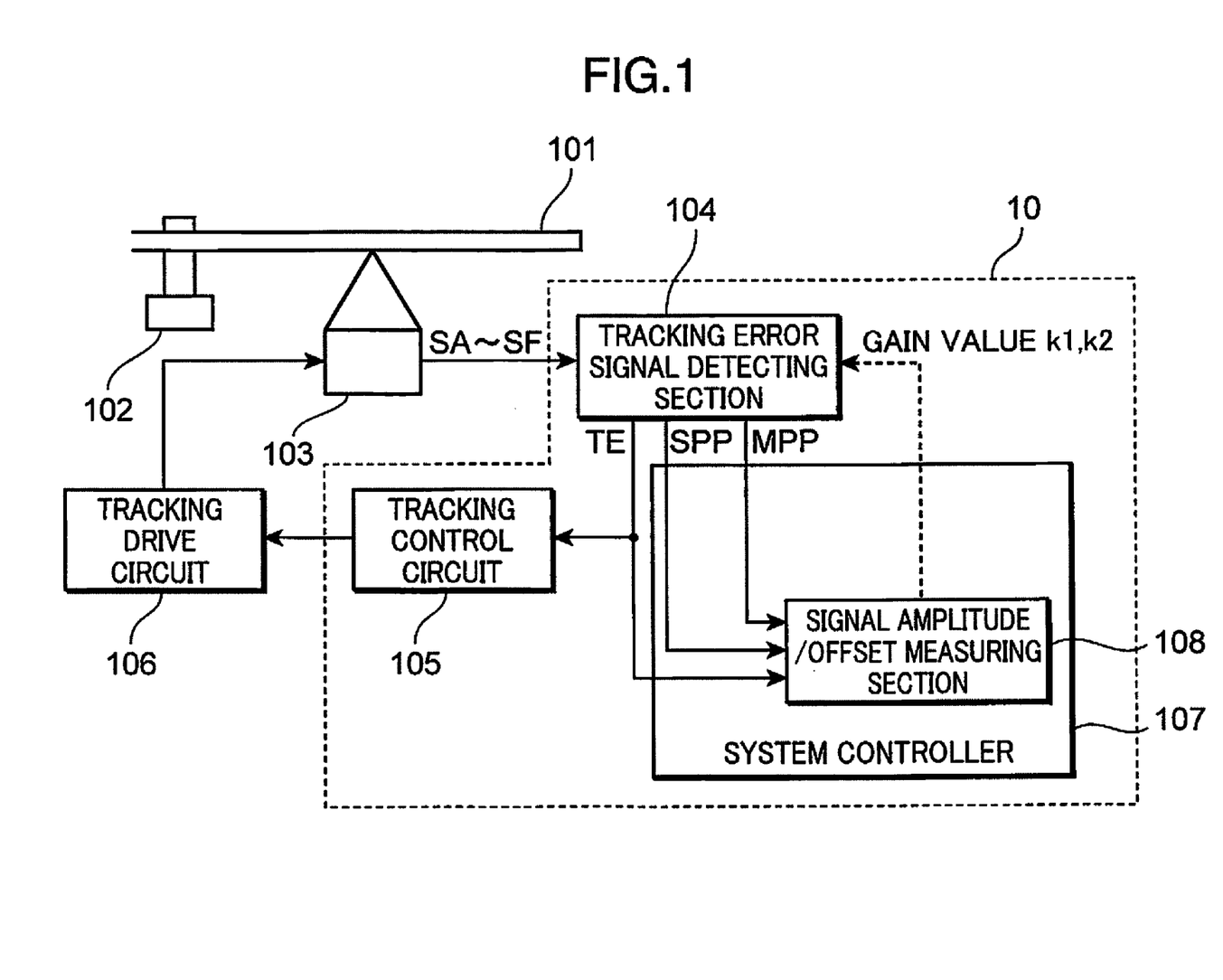
FIG. 1 is a block diagram showing an arrangement of an optical disc apparatus in accordance with a first embodiment of the invention.

FIG. 1 is a block diagram showing an arrangement of an optical disc apparatus in accordance with the first embodiment of the invention.

The optical disc apparatus in the first embodiment includes a disc motor 102, an optical head 103, a tracking error signal detecting section 104, a tracking control circuit 105, a tracking drive circuit 106, and a system controller 107.

The disc motor 102 rotates an optical disc 101 at a predetermined number of rotations. The optical head 103 reproduces information from the optical disc 101 or records information on the optical disc 101. The optical head 103 is constituted of e.g. a light source such as a semiconductor laser, a collimator lens, a diffraction grating, a polarized beam splitter, a polarizer, an objective lens, a condenser lens, a photodetector unit, and a tracking actuator. The tracking actuator moves the objective lens in the optical head 103 in a direction perpendicular to a track direction of the optical disc 101.

Since the arrangement and the operation of focus control of controlling a convergence point of a light beam on an information layer of the optical disc 101 are not directly related to the description of the first embodiment, description thereof will be omitted herein.

A light beam generated in the light source of the optical head 103 is collimated into parallel light by the collimator lens, and divided into a main beam i.e. zero-th order diffraction light, and sub beams i.e. ±first order diffraction light by the diffraction grating. The main beam and the sub beams are reflected on the polarized beam splitter, transmitted through the polarizer, and converged through the objective lens, whereby light beam spots are formed in such a manner that a focal point is formed in the thickness direction of the optical disc 101. The light beam spots of the main beam and the sub beams are irradiated onto a predetermined information layer of the optical disc 101 being rotated by the disc motor 102.

In this embodiment, the light beam spots of the paired sub beams are irradiated, while being displaced from the light beam spot of the main beam by a distance corresponding to approximately N+½× track pitch (where N is a positive integer). The light beam spots of the main beam and the sub beams are irradiated onto the predetermined information layer of the optical disc 101 being rotated by the disc motor 102. The main beam and the sub beams reflected on the predetermined information layer of the optical disc 101 are incident into the photodetector unit in the optical head 103 via the objective lens, the polarizer, the polarized beam splitter, and the condenser lens.

A signal subjected to photoelectric conversion in the photodetector unit is inputted to a tracking control device 10. The tracking control device 10 includes at least the tracking error signal detecting section 104, the tracking control circuit 105, and the system controller 107. Alternatively, the tracking control device 10 may be constituted of a single chip integrated circuit.

The tracking control device 10 converges the main beam and the sub beams on the optical disc 101 having plural information layers, and controls a convergence point of the main beam to scan a track on a predetermined information layer of the optical disc 101, based on a tracking error signal obtained by subtracting a sub push-pull signal generated from returning light of the sub beam reflected on the predetermined information layer from a main push-pull signal generated from returning light of the main beam reflected on the predetermined information layer.

The tracking error signal detecting section 104 detects a tracking error signal (hereinafter, also called as a "TE signal") for controlling a convergence point of a light beam to scan a track. The tracking error signal detecting section 104 detects a tracking error signal depending on a positional displacement between a convergence point of the main beam, and a track on the information layer. A method for detecting a tracking error signal will be described later in detail.

The TE signal detected by the tracking error signal detecting section 104 is inputted to the tracking control circuit 105. The TE signal inputted to the tracking control circuit 105 is transmitted through a compensation filter in e.g. a digital signal processor (DSP). The compensation filter is a digital filter constituted of an adder, a multiplier, and a delay device. The TE signal is then inputted to the tracking drive circuit 106, as a tracking drive signal. The tracking control circuit 105 controls a convergence point of the main beam to scan a track, based on the tracking error signal detected by the tracking error signal detecting section 104.

The tracking drive circuit 106 drives the tracking actuator by properly subjecting the tracking drive signal, which is an output signal from the tracking control circuit 105, to current amplification and level conversion. Thus, the tracking actuator is driven to allow a convergence point of a light beam on the optical disc 101 to scan a specified track to thereby realize the tracking control.

The system controller 107 is provided with a signal amplitude/offset measuring section 108. The signal amplitude/offset measuring section 108 will be described later.

Figure 2:
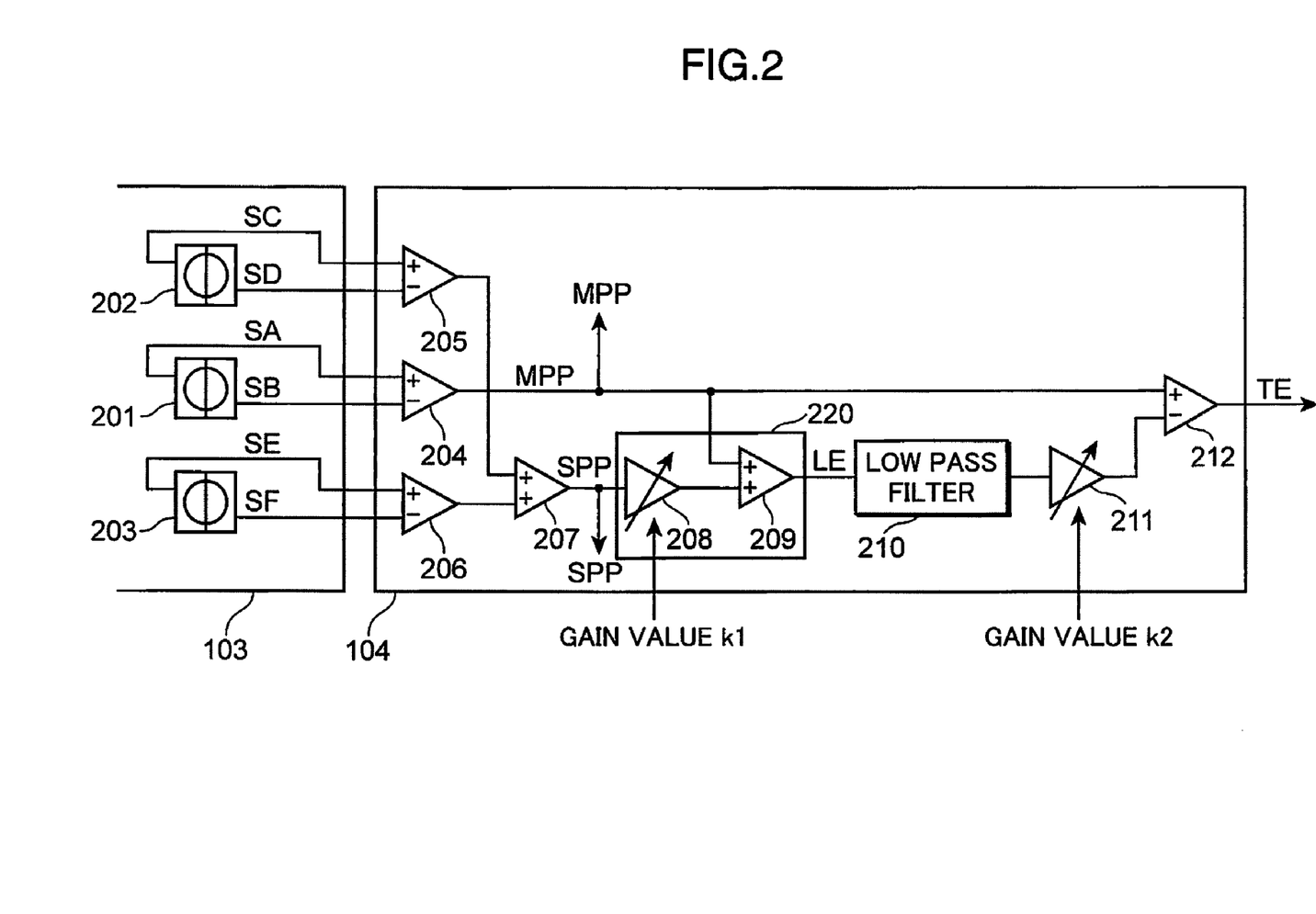
FIG. 2 is a diagram showing an arrangement of a tracking error signal detecting section in the first embodiment of the invention.

Next, the photodetector unit in the optical head 103, and the tracking error signal detecting section 104 are described in association with a method for detecting a tracking error signal, referring to the construction diagram of FIG. 2 as well as the block diagram of FIG. 1.

FIG. 2 is a diagram showing an arrangement of the tracking error signal detecting section in the first embodiment of the invention. The optical head 103 includes a first photodetector 201, a second photodetector 202, and a third photodetector 203. The tracking error signal detecting section 104 includes a subtractor 204, a subtractor 205, a subtractor 206, an adder 207, a multiplier 208, an adder 209, a low pass filter 210, a multiplier 211, and a subtractor 212. A sub push-pull signal correcting section 220 includes the multiplier 208 and the adder 209.

The sub push-pull signal correcting section 220 corrects an SPP signal in such a manner that a track crossing component of an MPP signal to be generated from returning light of a main beam, and a track crossing component of the SPP signal to be generated from returning light of a sub beam are cancelled.

The photodetector unit for generating an MPP signal and an SPP signal is constituted of three photodetectors (i.e. the first photodetector 201, the second photodetector 202, and the third photodetector 203). Each of the first photodetector 201, the second photodetector 202, and the third photodetector 203 is divided into two light receiving areas or photodetecting portions. The first photodetector 201 receives reflection light of a main beam spot. Signals SA and SB outputted from the photodetecting portions obtained by dividing the first photodetector 201 in two are inputted to the subtractor 204. The subtractor 204 calculates a difference between the signal SA and the signal SB, and generates an MPP signal.

Further, the second photodetector 202 receives reflection light of one of a pair of sub beam spots, and the third photodetector 203 receives reflection light of the other of the paired sub beam spots. Signals SC and SD outputted from photodetecting portions obtained by dividing the second photodetector 202 in two are inputted to the subtractor 205, and signals SE and SF outputted from photodetecting portions obtained by dividing the third photodetector 203 in two are inputted to the subtractor 206. The subtractor 205 calculates a difference between the signal SC and the signal SD, and outputs the calculated differential signal to the adder 207. The subtractor 206 calculates a difference between the signal SE and the signal SF, and outputs the calculated differential signal to the adder 207.

The adder 207 sums the differential signal from the subtractor 205 and the differential signal from the subtractor 206 to thereby generate an SPP signal. The multiplier 208 amplifies the SPP signal outputted from the adder 207 by using a gain value k1 set by the system controller 107 as a multiplier factor. Specifically, the multiplier 208 multiplies the SPP signal by the predetermined gain value k1. The adder 209 sums the SPP signal multiplied with the gain value k1 by the multiplier 208, and the MPP signal outputted from the subtractor 204. The output signal (LE signal) from the adder 209 is inputted to the low pass filter 210.

The low pass filter 210 reduces a high frequency component of the SPP signal corrected by the sub push-pull signal correcting section 220. The high frequency component corresponds to a stray light component of the main beam from the other layer. The multiplier 211 amplifies the LE signal passing the low pass filter 210 by using a gain value k2 set by the system controller 107 as a multiplier factor. Specifically, the multiplier 211 multiplies the LE signal passing the low pass filter 210 by the predetermined gain value k2.

The subtractor 212 calculates a difference between the LE signal multiplied with the gain value k2 by the multiplier 211, and the MPP signal outputted from the subtractor 204 to thereby generate a TE signal. Specifically, the subtractor 212 generates a TE signal by subtracting the SPP signal passing the low pass filter 210 from the MPP signal.

The signal amplitude/offset measuring section 108 measures the amplitude of the SPP signal and the amplitude of the MPP signal, calculates the gain value k1, based on the measured amplitude of the SPP signal and the measured amplitude of the MPP signal, and sets the calculated gain value k1 in the multiplier 208. The signal amplitude/offset measuring section 108 calculates the gain value k1 in such a manner that the amplitude of the SPP signal to be inputted to the adder 209, and the amplitude of the MPP signal are equal to each other.

In the first embodiment, each of the first through the third photodetectors 201 through 203 is divided into two photodetecting portions. The invention is not specifically limited to the above. Alternatively, each of the first through the third photodetectors 201 through 203 may be divided into four photodetecting portions. Further alternatively, each of two of the first through the third photodetectors 201 through 203 may be divided into two photodetecting portions, and the remaining one of the first through the third photodetectors 201 through 203 may be divided into four photodetecting portions. Further alternatively, one of the first through the third photodetectors 201 through 203 may be divided into two photodetecting portions, and each of the remaining two of the first through the third photodetectors 201 through 203 may be divided into four photodetecting portions. The number for dividing the photodetector is not limited to two or four.

In the first embodiment, the tracking error signal detecting section 104 corresponds to an example of a tracking error signal detecting section, the tracking control circuit 105 corresponds to an example of a tracking control section, the sub push-pull signal correcting section 220 corresponds to an example of a sub push-pull signal correcting section, the low pass filter 210 corresponds to an example of a low pass filter, the subtractor 212 corresponds to an example of a tracking error signal generating section, the multiplier 208 corresponds to an example of a multiplier, the adder 209 corresponds to an example of an adder, the signal amplitude/offset measuring section 108 corresponds to an example of a signal amplitude measuring section, and the optical head 103 corresponds to an example of an optical head.

Next, a method for adjusting the gain value k1 in the multiplier 208 is described. An MPP signal and an SPP signal are inputted to the signal amplitude/offset measuring section 108 in the system controller 107. In the case where the focus control is in an on-state, and the tracking control is in an off-state, each of the MPP signal and the SPP signal can be observed as a sinewave signal, each time when a light beam crosses a track by decentering. The signal amplitude/offset measuring section 108 measures the amplitude of the inputted MPP signal and the amplitude of the SPP signal.

The signal amplitude/offset measuring section 108 computes the gain value k1, using the measured signal amplitudes, based on the following equation (1), and sets the computed gain value k1 in the multiplier 208. Specifically, the signal amplitude/offset measuring section 108 adjusts the gain value k1 in such a manner that the amplitude of an input signal to the adder 209 and the amplitude of the MPP signal are equal to each other. The signal amplitude/offset measuring section 108 calculates the gain value k1 by dividing the amplitude of the MPP signal by the amplitude of the SPP signal.

$$MPP \text{ signal amplitude} = k1 \times SPP \text{ signal amplitude} \quad (1)$$

The MPP signal and the SPP signal are signals whose phases are inverted from each other by 180 degrees, and offsets are generated in the MPP signal and the SPP signal in the same direction at the time of lens shift. In view of this, adjusting the gain value k1 in such a manner that the amplitude of the input signal to the adder 209 and the amplitude of the MPP signal are equal to each other yields an output signal (LE signal) from the adder 209 free of a track crossing component in proportion to the amount of lens shift. However, the SPP signal is superimposed with a high frequency component, resulting from interference of a stray light component of the main beam from the other layer, and the LE signal is also superimposed with a high frequency component. In view of this, reducing the high frequency component by the low pass filter 210 enables to generate an LE signal free of an influence of stray light of the main beam from the other layer.

Next, a method for adjusting the gain value k2, which is a mixing ratio between the output signal from the low pass filter 210, and the MPP signal, is described. The signal amplitude/offset measuring section 108 shifts the objective lens toward the inner circumferential side and the outer circumferential side of the optical disc 101 along the radial direction of the optical disc 101, and measures offsets of the IE signal at the time of the lens shift. The signal amplitude/offset measuring section 108 adjusts the gain value k2 in such a manner that an offset is not generated in the TE signal even at the time of lens shift, and sets the adjusted gain value k2 in the multiplier 211. Since the concrete adjusting method of the gain value k2 is the same as the adjusting method in the conventional DPP method, detailed description thereof is omitted herein.

The lower the cutoff frequency of the low pass filter 210 is, the better in order to suppress interference of a stray light component from the other layer. However, an excessively low cutoff frequency may generate a phase delay with respect to an MPP signal. Conversely, an excessively high cutoff frequency may generate residues of the track crossing component in the range of about several KHz to several ten KHz, resulting from adjustment variation of the gain value k1. In view of the above, it is preferable to set the cutoff frequency of the low pass filter 210 to a value (about 1 to 2 KHz) of about ten times of the rotation frequency of the optical disc 101.

Specifically, it is preferable to set the cutoff frequency of the low pass filter 210 higher than the rotation frequency of the optical disc 101. It is further preferable to set the cutoff frequency of the low pass filter 210 lower than the track crossing frequency in an off-state of the tracking control. The cutoff frequency of the low pass filter 210 may be changed depending on the rotation frequency of the optical disc 101. For instance, the cutoff frequency of the low pass filter 210 may be increased, as the rotation frequency of the optical disc 101 is increased.

As described above, the SPP signal is corrected in such a manner that the track crossing component of the MPP signal, and the track crossing component of the SPP signal are cancelled, the high frequency component of the corrected SPP signal is reduced, and the SPP signal passing the low pass filter 210 is subtracted from the MPP signal. This enables to reduce an influence of stray light of the main beam from the other layer on tracking control, and realize stable tracking control. Further, in a sample servo system of sampling only a space portion at the time of recording, even if the frequency characteristic of the SPP signal is low, or the signal quality (S/N ratio) is poor, stable tracking control can be realized by an averaging effect by the low pass filter 210.

In the first embodiment, described is an optical head constructed such that a pair of sub beam spots are irradiated, while being displaced from the main beam spot by a distance corresponding to approximately N+½× track pitch (N is a positive integer). As far as the phases of the MPP signal and the SPP signal are inverted from each other by 180 degrees, and offsets of the MPP signal and the SPP signal are generated in the same direction at the time of lens shift, there is no restriction on the irradiation positions of the paired sub beams and the main beam.

Second Embodiment

Figure 3:
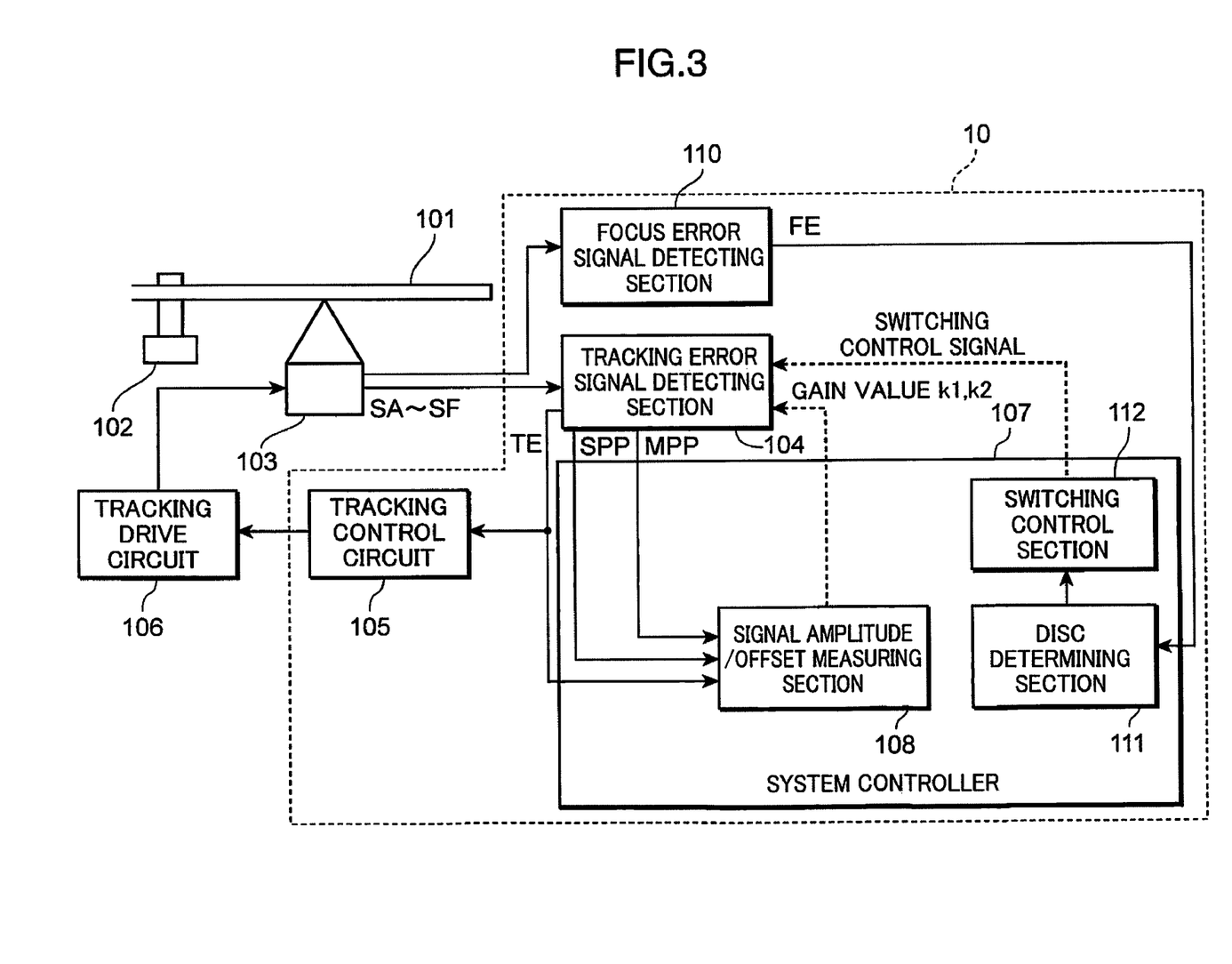
FIG. 3 is a block diagram showing an arrangement of an optical disc apparatus in accordance with a second embodiment of the invention.
Figure 4:
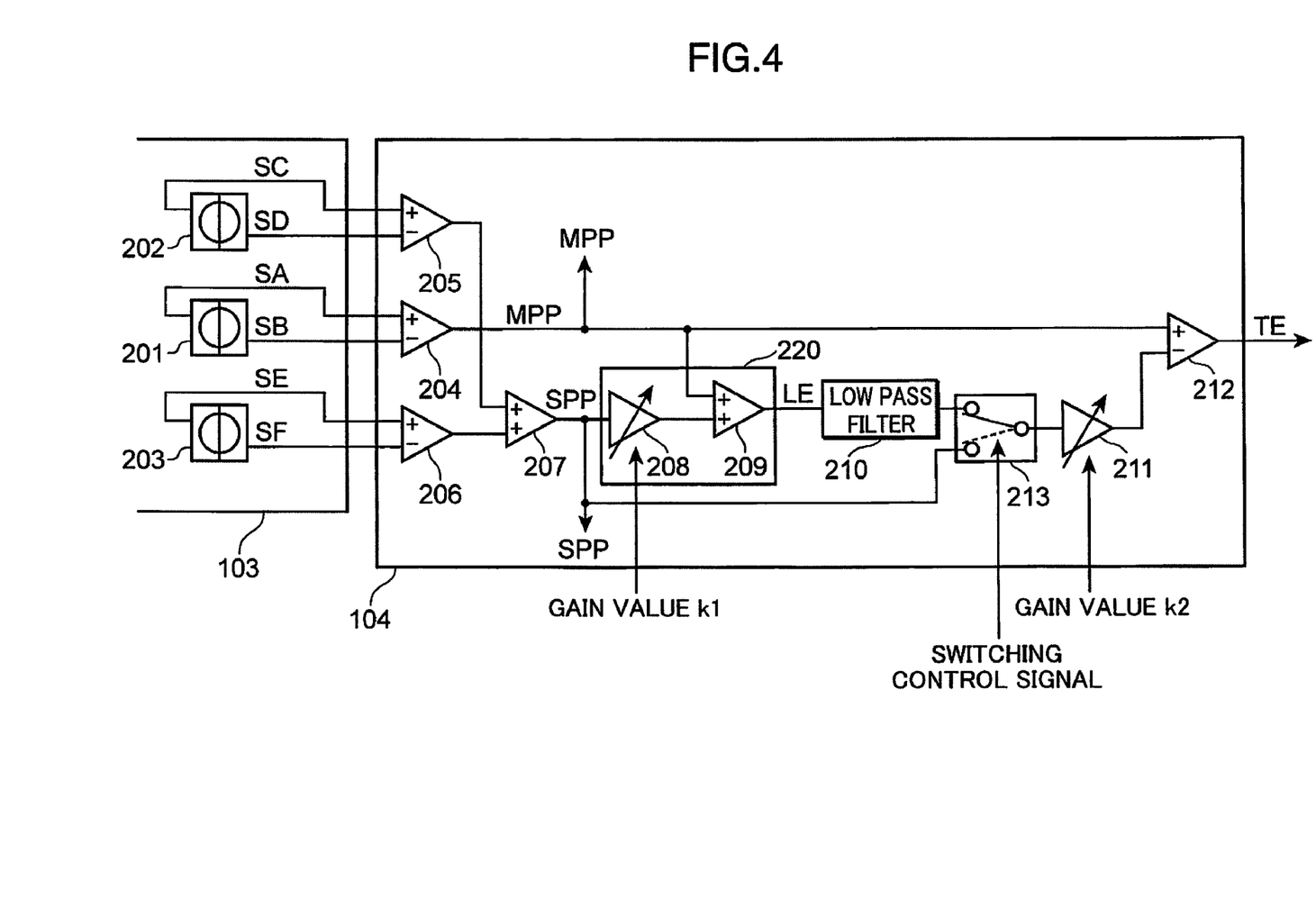
FIG. 4 is a diagram showing an arrangement of a tracking error signal detecting section in the second embodiment of the invention.

FIG. 3 is a block diagram showing an arrangement of an optical disc apparatus in accordance with the second embodiment of the invention. FIG. 4 is a diagram showing an arrangement of a tracking error signal detecting section in the second embodiment of the invention.

The optical disc apparatus in the second embodiment includes a disc motor 102, an optical head 103, a tracking error signal detecting section 104, a tracking control circuit 105, a tracking drive circuit 106, a system controller 107, and a focus error signal detecting section 110. The system controller 107 includes a signal amplitude/offset measuring section 108, a disc determining section 111, and a switching control section 112.

Elements in the optical disc apparatus of the second embodiment shown in FIG. 3, which are substantially identical or equivalent to those in the optical disc apparatus of the first embodiment shown in FIG. 1, are indicated with the same reference numerals, and description thereof is omitted herein. Further, elements in the tracking error signal detecting section of the second embodiment shown in FIG. 4, which are substantially identical or equivalent to those in the tracking error signal detecting section of the first embodiment shown in FIG. 2, are indicated with the same reference numerals, and description thereof is omitted herein.

A switch 213 switches between a first state where a low pass filter 210 and a multiplier 211 are electrically connected to each other, and a second state where an adder 207 and the multiplier 211 are electrically connected to each other, based on a switching control signal outputted from the system controller 107. Specifically, the switch 213 switches between the first state where a sub push-pull signal passing the low pass filter 210 is inputted to the multiplier 211, and the second state where a sub push-pull signal before the input to a sub push-pull signal correcting section 220 is inputted to the multiplier 211.

The focus error signal detecting section 110 detects a focus error signal (hereinafter, also called as an "FE signal") for controlling and positioning a convergence point of a light beam on an information layer of an optical disc 101. The focus error signal detecting section 110 detects a positional displacement between a focus position of a light beam irradiated onto the optical disc 101, and an information layer of the optical disc 101, as an FE signal. The FE signal can be generated by e.g. an astigmatism method.

The disc determining section 111 determines whether or not the optical disc 101 loaded in the optical disc apparatus is a DVD medium for recording or reproducing information with red laser light, based on the amplitude and the asymmetry of an S-shaped FE signal which is obtained by driving a focus actuator (not shown) mounted in the optical head 103 up and down; and determines the number of information layers of the optical disc 101 based on the detected number of S-shapes. The aforementioned determining methods are well-known, but the method for determining whether the optical disc 101 is a two-layer DVD medium before start of tracking control is not limited to the above methods.

The switching control section 112 outputs a switching control signal to the switch 213 in the tracking error signal detecting section 104 in accordance with a determination result of the disc determining section 111. The switching control section 112 switches the switch 213 to the first state, in the case where at least two information layers are detected by the disc determining section 111, and switches the switch 213 to the second state, in the case where one information layer is detected by the disc determining section 111.

Specifically, in the case where the loaded optical disc 101 is determined to be a two-layer DVD medium by the disc determining section 111, the switching control section 112 outputs a switching control signal for electrically connecting the low pass filter 210 and the multiplier 211 to the switch 213 in the tracking error signal detecting section 104. On the other hand, in the case where the loaded optical disc 101 is determined to be a single-layer DVD medium or a medium other than the DVD medium by the disc determining section 111, the switching control section 112 outputs a switching control signal for electrically connecting the adder 207 and the multiplier 211 to the switch 213 in the tracking error signal detecting section 104.

The first state corresponds to the method for detecting a tracking error signal in the first embodiment, and the second state corresponds to a conventional method for detecting a tracking error signal. Specifically, in the case where the loaded optical disc 101 is a two-layer DVD medium, the multiplier 208 multiplies the SPP signal outputted from the adder 207 by the gain value k1 set in the system controller 107, the adder 209 sums the SPP signal multiplied with the gain value k1, and the MPP signal outputted from the subtractor 204, and the low pass filter 210 reduces a high frequency component. On the other hand, in the case where the loaded optical disc 101 is a single-layer DVD medium or a medium other than the DVD medium, the SPP signal outputted from the adder 207 is inputted to the multiplier 211.

In the second embodiment, the switch 213 corresponds to an example of a switch, the disc determining section 111 corresponds to an example of an information layer number detecting section, and the switching control section 112 corresponds to an example of a switching control section. Further, the tracking control device 10 includes at least the tracking error signal detecting section 104, the tracking control circuit 105, the system controller 107, and the focus error signal detecting section 110. Alternatively, the tracking control device 10 may be constituted of a single chip integrated circuit.

As described above, in the case where the number of information layers of the optical disc 101 is at least two, the sub push-pull signal correcting section 220 corrects a sub push-pull signal, and the low pass filter 210 reduces a high frequency component of the sub push-pull signal. On the other hand, in the case where the number of information layers of the optical disc 101 is one, a sub push-pull signal before the input to the sub push-pull signal correcting section 220 is inputted to the multiplier 211, without performing processes by the sub push-pull signal correcting section 220 and the low pass filter 210.

The above arrangement enables to shorten the time required for generating a tracking error signal, in the case where the number of information layers of the optical disc 101 is one.

In the second embodiment, the disc determining section 111 determines whether or not the loaded optical disc 101 is a DVD medium, and determines the number of information layers of the optical disc 101. The invention is not specifically limited to the above. Alternatively, the disc determining section 111 may determine only the number of information layers of the loaded optical disc 101.

In the first and the second embodiments, the respective functional blocks of the tracking error signal determining section 104, the tracking control circuit 105, and the system controller 107 are typically realized as an LSI, which is an integrated circuit. Alternatively, the respective functional blocks may be individually integrated into one chip, or a part of all of the functional blocks may be integrated into a chip.

In the embodiments, the respective functional blocks are integrated into an LSI. Alternatively, the LSI may be called as an IC, a system LSI, a super LSI, or an ultra LSI according to the degree of integration.

The method for producing an integrated circuit is not limited to the method for producing an LSI, but may be realized by a dedicated circuit or a general-purpose processor. Further alternatively, it is possible to use an FPGA (Field Programmable Gate Array) capable of programming, or a reconfigurable processor capable of reconfiguring connection and setting of circuit cells in an LSI, after producing the LSI.

As another possibility, a novel integrated circuit technology to replace LSIs may be developed in the near future as a result of advancement of the semiconductor technology or any other related technology. In such a case, the functional blocks may be integrated by the novel technology. For instance, the functional blocks may be integrated by utilizing a biotechnology.

The aforementioned embodiments mainly include the features having the following arrangements.

A tracking control device according to an aspect of the invention is a tracking control device for converging a main beam and a sub beam on an information recording medium having plural information layers, and controlling a convergence point of the main beam to scan a track on the information layer. The tracking control device includes a tracking error signal detecting section which detects a tracking error signal depending on a positional displacement between the convergence point of the main beam, and the track on the information layer; and a tracking control section which controls the convergence point of the main beam to scan the track, based on the tracking error signal detected by the tracking error signal detecting section, wherein the tracking error signal detecting section includes: a sub push-pull signal correcting section which corrects a sub push-pull signal to be generated from returning light of the sub beam in such a manner that a track crossing component of a main push-pull signal to be generated from returning light of the main beam, and a track crossing component of the sub push-pull signal to be generated from the returning light of the sub beam are cancelled; a low pass filter which reduces a high frequency component of the sub push-pull signal corrected by the sub push-pull signal correcting section; and a tracking error signal generating section which subtracts a sub push-pull signal passing the low pass filter from the main push-pull signal to thereby generate the tracking error signal.

In the above arrangement, the sub push-pull signal is corrected in such a manner that the track crossing component of the main push-pull signal to be generated from the returning light of the main beam, and the track crossing component of the sub push-pull signal to be generated from the returning light of the sub beam are cancelled. Then, the high frequency component of the corrected sub push-pull signal is reduced, and the sub push-pull signal whose high frequency component is reduced is subtracted from the main push-pull signal to thereby generate the tracking error signal.

Thus, since the sub push-pull signal is corrected in such a manner that the track crossing component of the main push-pull signal to be generated from the returning light of the main beam, and the track crossing component of the sub push-pull signal to be generated from the returning light of the sub beam are cancelled, it is possible to reduce an offset generated at the time of lens shift to thereby stably perform the tracking control. Further, since the high frequency component of the sub push-pull signal is reduced, it is possible to reduce an influence of stray light of the main beam from the other layer on the tracking control.

In the tracking control device, preferably, the sub push-pull signal correcting section may include a multiplier which multiplies the sub push-pull signal by a predetermined gain value, and an adder which adds the main push-pull signal to the sub push-pull signal outputted from the multiplier.

In the above arrangement, the sub push-pull signal is multiplied with the predetermined gain value by the multiplier, and the main push-pull signal is added to the sub push-pull signal outputted from the multiplier by the adder.

Since the sub push-pull signal is multiplied with the predetermined gain value, and the main push-pull signal is added to the sub push-pull signal, the sub push-pull signal can be corrected in such a manner that the track crossing component of the main push-pull signal and the track crossing component of the sub push-pull signal are cancelled.

Preferably, the tracking control device may further include a signal amplitude measuring section which measures an amplitude of the sub push-pull signal and an amplitude of the main push-pull signal, calculates the gain value based on the measured amplitude of the sub push-pull signal and the measured amplitude of the main push-pull signal, and sets the calculated gain value in the multiplier.

In the above arrangement, the amplitude of the sub push-pull signal and the amplitude of the main push-pull signal are measured, the gain value is calculated based on the measured amplitude of the sub push-pull signal and the measured amplitude of the main push-pull signal, and the calculated gain value is set in the multiplier.

Thus, a proper gain value can be calculated and set in the multiplier, based on the amplitude of the sub push-pull signal and the amplitude of the main push-pull signal.

In the tracking control device, preferably, the signal amplitude measuring section may calculate the gain value in such a manner that the amplitude of the sub push-pull signal to be inputted to the adder, and the amplitude of the main push-pull signal are equal to each other.

In the above arrangement, since the gain value is calculated in such a manner that the amplitude of the sub push-pull signal to be inputted to the adder, and the amplitude of the main push-pull signal are equal to each other, it is possible to output, from the adder, a sub push-pull signal free of a track crossing component in proportion to the amount of lens shift.

In the tracking control device, preferably, the tracking error signal detecting section may include a switch which switches between a first state where the sub push-pull signal passing the low pass filter is inputted to the tracking error signal generating section, and a second state where the sub push-pull signal before the input to the sub push-pull signal correcting section is inputted to the tracking error signal generating section, and the tracking control device may further include an information layer number detecting section which detects the number of the information layers of the information recording medium, and a switching control section which controls the switch to the first state, if at least two information layers are detected by the information layer number detecting section, and controls the switch to the second state, if one information layer is detected by the information layer number detecting section.

In the above arrangement, the switch is operable to switch between the first state where the sub push-pull signal passing the low pass filter is inputted to the tracking error signal generating section, and the second state where the sub push-pull signal before the input to the sub push-pull signal correcting section is inputted to the tracking error signal generating section. Then, the number of information layers of the information recording medium is detected; and the switch is switched to the first state if at least two information layers are detected, and is switched to the second state if one information layer is detected.

Specifically, in the case where the number of information layers of the information recording medium is at least two, the sub push-pull signal correcting section corrects the sub push-pull signal, and the low pass filter reduces the high frequency component of the sub push-pull signal. On the other hand, in the case where the number of information layers of the information recording medium is one, the sub push-pull signal before the input to the sub push-pull signal correcting section is inputted to the tracking error signal generating section, without performing the processes by the sub push-pull signal correcting section and the low pass filter.

In the above arrangement, it is possible to shorten the time required for generating a tracking error signal, in the case where the number of information layers of the information recording medium is one.

In the tracking control device, preferably, a cutoff frequency of the low pass filter may be set higher than a rotation frequency of the information recording medium.

In the above arrangement, since the cutoff frequency of the low pass filter is set higher than the rotation frequency of the information recording medium, it is possible to prevent generation of a phase delay with respect to the main push-pull signal.

In the tracking control device, preferably, a cutoff frequency of the low pass filter may be set lower than a track crossing frequency in an off-state of the tracking control.

In the above arrangement, since the cutoff frequency of the low pass filter is set lower than the track crossing frequency in the off-state of the tracking control, it is possible to remove interference of a stray light component of the main beam from the other layer, without residues of the track crossing component.

A tracking control method according to another aspect of the invention is a tracking control method for converging a main beam and a sub beam on an information recording medium having plural information layers, and controlling a convergence point of the main beam to scan a track on the information layer. The tracking control method includes a tracking error signal detecting step of detecting a tracking error signal depending on a positional displacement between the convergence point of the main beam, and the track on the information layer; and a tracking control step of controlling the convergence point of the main beam to scan the track, based on the tracking error signal detected in the tracking error signal detecting step, wherein the tracking error signal detecting step includes: a sub push-pull signal correcting step of correcting a sub push-pull signal to be generated from returning light of the sub beam in such a manner that a track crossing component of a main push-pull signal to be generated from returning light of the main beam, and a track crossing component of the sub push-pull signal to be generated from the returning light of the sub beam are cancelled; a high frequency component reducing step of reducing a high frequency component of the sub push-pull signal corrected in the sub push-pull signal correcting step; and a tracking error signal generating step of subtracting, from the main push-pull signal, a sub push-pull signal obtained by reducing the high frequency component in the high frequency component reducing step to thereby generate the tracking error signal.

In the above arrangement, the sub push-pull signal is corrected in such a manner that the track crossing component of the main push-pull signal to be generated from the returning light of the main beam, and the track crossing component of the sub push-pull signal to be generated from the returning light of the sub beam are cancelled. Then, the high frequency component of the corrected sub push-pull signal is reduced, and the sub push-pull signal whose high frequency component is reduced is subtracted from the main push-pull signal to thereby generate the tracking error signal.

Thus, since the sub push-pull signal is corrected in such a manner that the track crossing component of the main push-pull signal to be generated from the returning light of the main beam, and the track crossing component of the sub push-pull signal to be generated from the returning light of the sub beam are cancelled, it is possible to reduce an offset generated at the time of lens shift to thereby stably perform the tracking control. Further, since the high frequency component of the sub push-pull signal is reduced, it is possible to reduce an influence of stray light of the main beam from the other layer on the tracking control.

An optical disc apparatus according to still another aspect of the invention includes an optical head which is provided with a converging section which converges a main beam and a sub beam on a predetermined information layer of an information recording medium having plural information layers, a main beam receiving section which receives returning light of the main beam reflected on the predetermined information layer, a sub beam receiving section which receives returning light of the sub beam reflected on the predetermined information layer, and a track direction moving section which moves the converging section in a direction perpendicular to a track on the information layer; and the tracking control device having one of the above arrangements.

In the above arrangement, the sub push-pull signal is corrected in such a manner that the track crossing component of the main push-pull signal to be generated from the returning light of the main beam, and the track crossing component of the sub push-pull signal to be generated from the returning light of the sub beam are cancelled. Then, the high frequency component of the corrected sub push-pull signal is reduced, and the sub push-pull signal whose high frequency component is reduced is subtracted from the main push-pull signal to thereby generate the tracking error signal.

Thus, since the sub push-pull signal is corrected in such a manner that the track crossing component of the main push-pull signal to be generated from the returning light of the main beam, and the track crossing component of the sub push-pull signal to be generated from the returning light of the sub beam are cancelled, it is possible to reduce an offset generated at the time of lens shift to thereby stably perform the tracking control. Further, since the high frequency component of the sub push-pull signal is reduced, it is possible to reduce an influence of stray light of the main beam from the other layer on the tracking control.

The tracking control device, the tracking control method, and the optical disc apparatus of the invention enable to stably perform the tracking control and reduce an influence of stray light from the other layer on the tracking control, and accordingly, are useful as a tracking control device, a tracking control method, and an optical disc apparatus for converging a main beam and a sub beam on an information recording medium having plural information layers, and controlling a convergence point of the main beam to scan a track on the information layer.

The tracking control device, the tracking control method, and the optical disc apparatus of the invention are also useful as a DVD disc recorder loaded with a red laser light source, and a Blu-ray disc recorder loaded with a blue laser light source, for instance. Further, the tracking control device, the tracking control method, and the optical disc apparatus of the invention may be applied to e.g. a disc player or a PC (personal computer) drive, in addition to a disc recorder.

This application is based on Japanese Patent Application No. 2009-135850 filed on Jun. 5, 2009, the contents of which are hereby incorporated by reference.

The embodiments or the examples described in the detailed description of the invention are provided to clarify the technical contents of the invention. The invention should not be construed to be limited to the embodiments or the examples. The invention may be modified in various ways as far as such modifications do not depart from the spirit and the scope of the invention hereinafter defined.

What is claimed is:

1. A tracking control device for converging a main beam and a sub beam on an information recording medium having plural information layers, and controlling a convergence point of the main beam to scan a track on the information layer, the tracking control device comprising:
a tracking error signal detecting section which detects a tracking error signal depending on a positional displacement between the convergence point of the main beam, and the track on the information layer; and
a tracking control section which controls the convergence point of the main beam to scan the track, based on the tracking error signal detected by the tracking error signal detecting section, wherein
the tracking error signal detecting section includes:
a sub push-pull signal correcting section which corrects a sub push-pull signal to be generated from returning light of the sub beam in such a manner that a track crossing component of a main push-pull signal to be generated from returning light of the main beam, and a track crossing component of the sub push-pull signal to be generated from the returning light of the sub beam are cancelled;
a low pass filter which reduces a high frequency component of the sub push-pull signal corrected by the sub push-pull signal correcting section; and
a tracking error signal generating section which subtracts a sub push-pull signal passing the low pass filter from the main push-pull signal to thereby generate the tracking error signal;
the tracking error signal detecting section includes a switch which switches between a first state where the sub push-pull signal passing the low pass filter is inputted to the tracking error signal generating section, and a second state where the sub push-pull signal before the input to the sub push-pull signal correcting section is inputted to the tracking error signal generating section; and
the tracking control device further includes:
an information layer number detecting section which detects the number of the information layers of the information recording medium, and
a switching control section which controls the switch to the first state, if at least two information layers are detected by the information layer number detecting section, and controls the switch to the second state, if one information layer is detected by the information layer number detecting section.

2. The tracking control device according to claim 1, wherein
the sub push-pull signal correcting section includes
a multiplier which multiplies the sub push-pull signal by a predetermined gain value, and
an adder which adds the main push-pull signal to the sub push-pull signal outputted from the multiplier.

3. The tracking control device according to claim 2, further comprising:
a signal amplitude measuring section which measures an amplitude of the sub push-pull signal and an amplitude of the main push-pull signal, calculates the gain value based on the measured amplitude of the sub push-pull signal and the measured amplitude of the main push-pull signal, and sets the calculated gain value in the multiplier.

4. The tracking control device according to claim 3, wherein
the signal amplitude measuring section calculates the gain value in such a manner that the amplitude of the sub push-pull signal to be inputted to the adder, and the amplitude of the main push-pull signal, are equal to each other.

5. The tracking control device according to claim 1, wherein
a cutoff frequency of the low pass filter is set higher than a rotation frequency of the information recording medium.

6. The tracking control device according to claim 1, wherein
a cutoff frequency of the low pass filter is set lower than a track crossing frequency in an off-state of the tracking control.

7. A tracking control method for converging a main beam and a sub beam on an information recording medium having plural information layers, and controlling a convergence point of the main beam to scan a track on the information layer, the tracking control method comprising:
a tracking error signal detecting step of detecting a tracking error signal depending on a positional displacement between the convergence point of the main beam, and the track on the information layer; and
a tracking control step of controlling the convergence point of the main beam to scan the track, based on the tracking error signal detected in the tracking error signal detecting step, wherein
the tracking error signal detecting step includes:
a sub push-pull signal correcting step of correcting a sub push-pull signal to be generated from returning light of the sub beam in such a manner that a track crossing component of a main push-pull signal to be generated from returning light of the main beam, and a track crossing component of the sub push-pull signal to be generated from the returning light of the sub beam are cancelled;
a high frequency component reducing step of reducing a high frequency component of the sub push-pull signal corrected in the sub push-pull signal correcting step; and
a tracking error signal generating step of subtracting, from the main push-pull signal, a sub push-pull signal obtained by reducing the high frequency component in the high frequency component reducing step to thereby generate the tracking error signal;

the tracking error signal detecting step includes a switching step of switching between a first state where the sub push-pull signal that has passed in the high frequency component reducing step is used in the tracking error signal generating step, and a second state where the sub push-pull signal before the input to the sub push-pull signal correcting step is inputted to the tracking error signal generating step; and
the tracking control method further includes:
an information layer number detecting step which detects the number of the information layers of the information recording medium, and
a switching control step of switching to the first state, if at least two information layers are detected by the information layer number detecting section, and switching to the second state, if one information layer is detected by the information layer number detecting step.

8. An optical disc apparatus comprising:
an optical head including
a converging section which converges a main beam and a sub beam on a predetermined information layer of an information recording medium having plural information layers,
a main beam receiving section which receives returning light of the main beam reflected on the predetermined information layer,
a sub beam receiving section which receives returning light of the sub beam reflected on the predetermined information layer, and
a track direction moving section which moves the converging section in a direction perpendicular to a track on the information layer; and
the tracking control device of claim 1.

* * * * *